(12) United States Patent
Griffiths et al.

(10) Patent No.: US 10,549,395 B2
(45) Date of Patent: Feb. 4, 2020

(54) HAND TOOL FOR SELF ALIGNED PLACEMENT OF SURFACE MOUNTED TOOLING ELEMENT

(71) Applicant: Rolls-Royce Corporation, Indianapolis, IN (US)

(72) Inventors: George Griffiths, Carmel, IN (US); Andrew Stewart, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 214 days.

(21) Appl. No.: 15/868,632

(22) Filed: Jan. 11, 2018

(65) Prior Publication Data
US 2019/0210171 A1    Jul. 11, 2019

(51) Int. Cl.
*B23Q 3/18*    (2006.01)

(52) U.S. Cl.
CPC .................... *B23Q 3/186* (2013.01)

(58) Field of Classification Search
CPC ...................................................... B23Q 3/186
USPC ................. 33/533, 520, 613, 645, 644, 671
See application file for complete search history.

(56) References Cited

U.S. PATENT DOCUMENTS

| | | | | |
|---|---|---|---|---|
| 3,138,877 A | * | 6/1964 | Holt | B25D 5/00 33/671 |
| 3,492,734 A | * | 2/1970 | Heeter | B25D 5/00 33/671 |
| 4,593,450 A | * | 6/1986 | Dumire | B23Q 16/001 29/559 |
| 4,918,826 A | * | 4/1990 | Moore | B23Q 16/028 33/645 |
| 5,167,464 A | * | 12/1992 | Voellmer | B64G 1/641 403/13 |
| 5,220,730 A | * | 6/1993 | Cangelosi | G01B 5/0004 33/533 |
| 6,427,356 B1 | * | 8/2002 | Schamal | G01B 5/0025 33/520 |
| 7,458,169 B1 | * | 12/2008 | Coope | B23Q 3/183 33/645 |
| 8,387,267 B1 | * | 3/2013 | Ruhoff | G01B 5/00 33/613 |
| 2004/0003508 A1 | * | 1/2004 | Wu | F16B 5/0208 33/613 |
| 2006/0032069 A1 | * | 2/2006 | Jensen | G01B 3/22 33/645 |
| 2013/0318806 A1 | * | 12/2013 | Wang | G01B 5/25 33/533 |

(Continued)

*Primary Examiner* — Christopher W Fulton
(74) *Attorney, Agent, or Firm* — McCracken & Gillen LLC

(57) ABSTRACT

A hand tool enabling self-aligned placement and post alignment clamping of a surface mounted tooling element and a method for manufacturing such a tool. Using an additive manufacturing process, a tool housing may be manufactured in which one or more internal voids allow insertion and rotational movement along and about a longitudinal axis of the housing, respectively, of a member having a radially extending portion. A handle and a brace may be coupled to the proximal and distal ends of the member to facilitate operation of the tool and placement of the surface mounted tooling element, respectively. Such member may also be spring loaded to enable the tool to clamp itself to a workpiece during the mounting operation, with the radially extending member portion limiting rotational travel of the brace.

18 Claims, 4 Drawing Sheets

(56) References Cited

U.S. PATENT DOCUMENTS

2015/0096150 A1* 4/2015 Moreau .................... A45F 5/00
24/3.12

* cited by examiner

HAND TOOL FOR SELF ALIGNED PLACEMENT OF SURFACE MOUNTED TOOLING ELEMENT

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

FIELD OF DISCLOSURE

The present subject matter relates to hand tools for installing surface mounted tooling elements, and in particular, to hand tools for aligning such tooling elements during their initial placement.

BACKGROUND

System components that are manufactured so as to be adaptable for multiple and varied uses and/or users often require some mechanism or method for adjustment(s) to enable any necessary adaptations. For example, while an available mechanical system component may provide a needed functionality, it may also have certain physical characteristics, such as dimensions or mounting features (e.g., holes, slots, etc.), that require modification(s) for a planned use. Further physical modification of the system component itself may not be possible for various reasons, such as risk of damage to the component resulting from the form or manner of the applied modification, or costs associated with the modification(s) in view of the number of components ultimately needed.

For example, the assignee has a situation where a system component in which significant engineering, design and development work and costs have been invested to produce a high degree of performance of the task for which the component was designed. While it has found uses in a number of similar, though varied, applications, some modifications have been necessary. For example, in one case, the system component has a number of precisely designed and proportioned apertures in a metal panel having a precisely designed material, thickness and finish. Various uses for this component require numerous panel regions around the apertures to have thicknesses that differ not only from the original design but also among the various apertures. However, for various reasons, redesigning and manufacturing the component to have the different thicknesses is not viable or cost effective.

Instead, to accommodate this need for more and varied thicknesses, precision shims have been designed for installation with an adhesive to bond the shims to the panel. As part of their installation, in addition to their proper alignment and placement, clamping must be provided while the adhesive cures sufficiently to ensure that the shims remain properly aligned and placed. Such alignment, placement and clamping has been performed using hand tools requiring two persons, with one person needed to align and place the shim and another on the other side of the panel (which is large enough to preclude one person from being able to perform this operation alone) to engage the clamping action of the tool (e.g., by tightening a nut on a threaded shaft extending through the aperture). Accordingly, there is a need for a hand tool for enabling a single operator to perform this task while also enabling self-alignment of the shim and post alignment clamping.

SUMMARY

A hand tool enabling self-aligned placement and post alignment clamping of a surface mounted tooling element and a method for manufacturing such a tool is provided. Using an additive manufacturing process, a tool housing may be manufactured in which one or more internal voids allow insertion and rotational movement along and about a longitudinal axis of the housing, respectively, of a member having a radially extending portion. A handle and a brace may be coupled to the proximal and distal ends of the member to facilitate operation of the tool and placement of the surface mounted tooling element, respectively. Such member may also be spring loaded to enable the tool to clamp itself to a workpiece during the mounting operation, with the radially extending member portion limiting rotational travel of the brace.

In accordance with an exemplary embodiment, a tool includes: a housing with proximal and distal housing ends having respective end apertures in communication via a first internal void between the proximal and distal housing ends; a second internal void in the housing in communication with a portion of the first internal void and including a first void portion parallel with a longitudinal portion of the first internal void, and a second void portion adjacent a peripheral portion of the first internal void; and one or more internal members including a first member portion with proximal and distal member ends disposed at least in the first internal void between the proximal and distal housing ends, and a second member portion extending radially from the first member portion into one of the first or second void portion.

In accordance with another exemplary embodiment, a tool includes: a housing with proximal and distal housing ends having respective end apertures in communication via a first internal void between the proximal and distal housing ends; a second internal void in the housing and including orthogonal first and second portions in communication with a portion of the first internal void; and one or more internal members including a first member portion with proximal and distal member ends disposed at least in the first internal void between the proximal and distal housing ends, and a second member portion extending radially from the first member portion into the second internal void.

In accordance with another exemplary embodiment, a method for manufacturing a tool includes: forming, via an additive manufacturing process, a housing including proximal and distal housing ends having respective end apertures, a first internal void providing communication between the proximal and distal housing ends, and a second internal void including orthogonal first and second portions in communication with a portion of the first internal void; and inserting one or more internal members including a first member portion with proximal and distal member ends disposed at least in the first internal void between the proximal and distal housing ends, and a second member portion extending radially from the first member portion into the second internal void.

DETAILED DESCRIPTION

The following detailed description is of example embodiments with references to the accompanying drawings. Such description is intended to be illustrative and not limiting. Such embodiments are described in sufficient detail to enable one of ordinary skill in the art to practice the disclosed embodiments, and it will be understood that other embodiments may be practiced with some variations without departing from the spirit or scope of the present disclosure.

Figure 1:
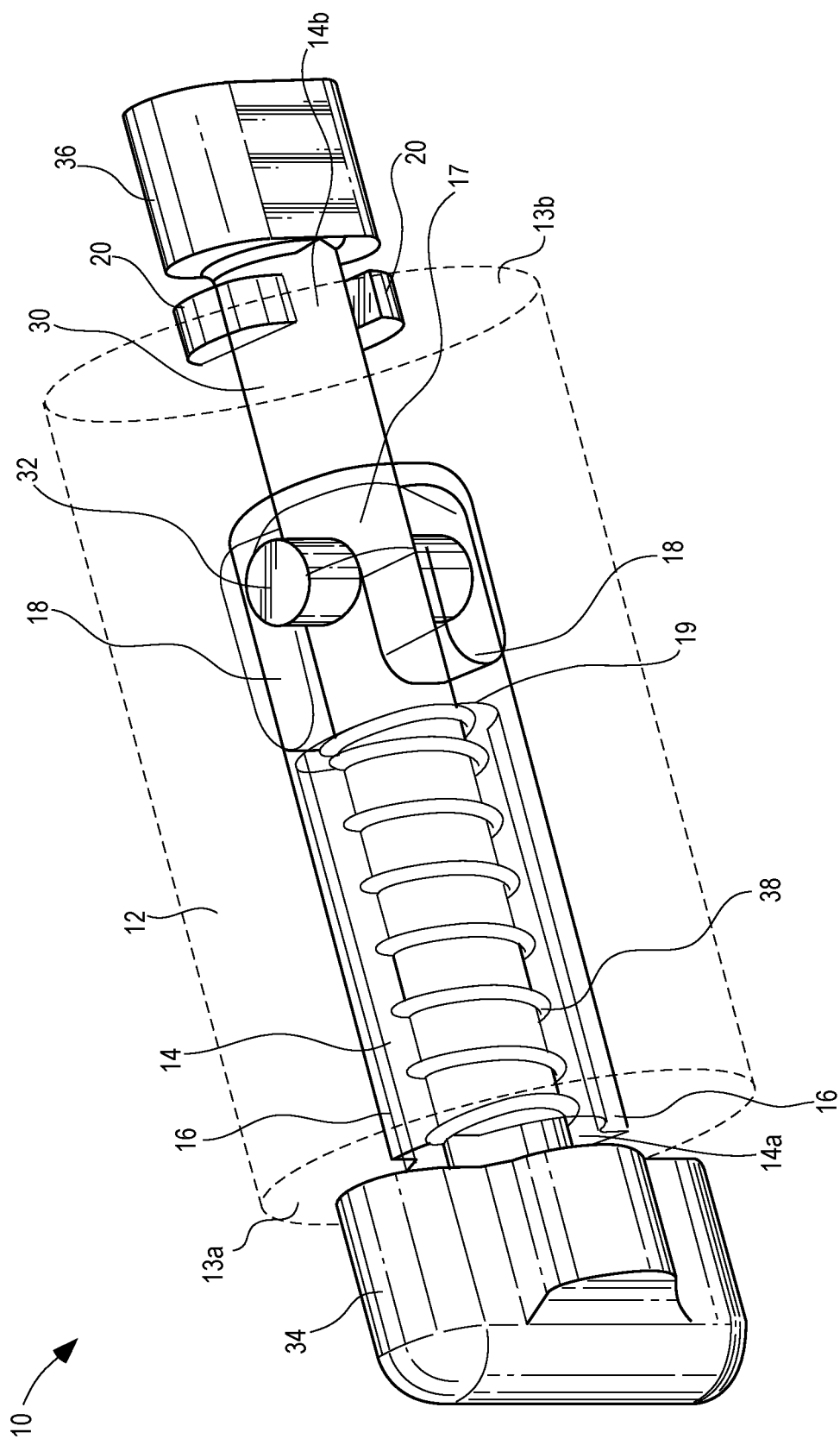
FIG. 1 depicts an isometric view including external and internal features of a hand tool in accordance with exemplary embodiments.
Figure 2:
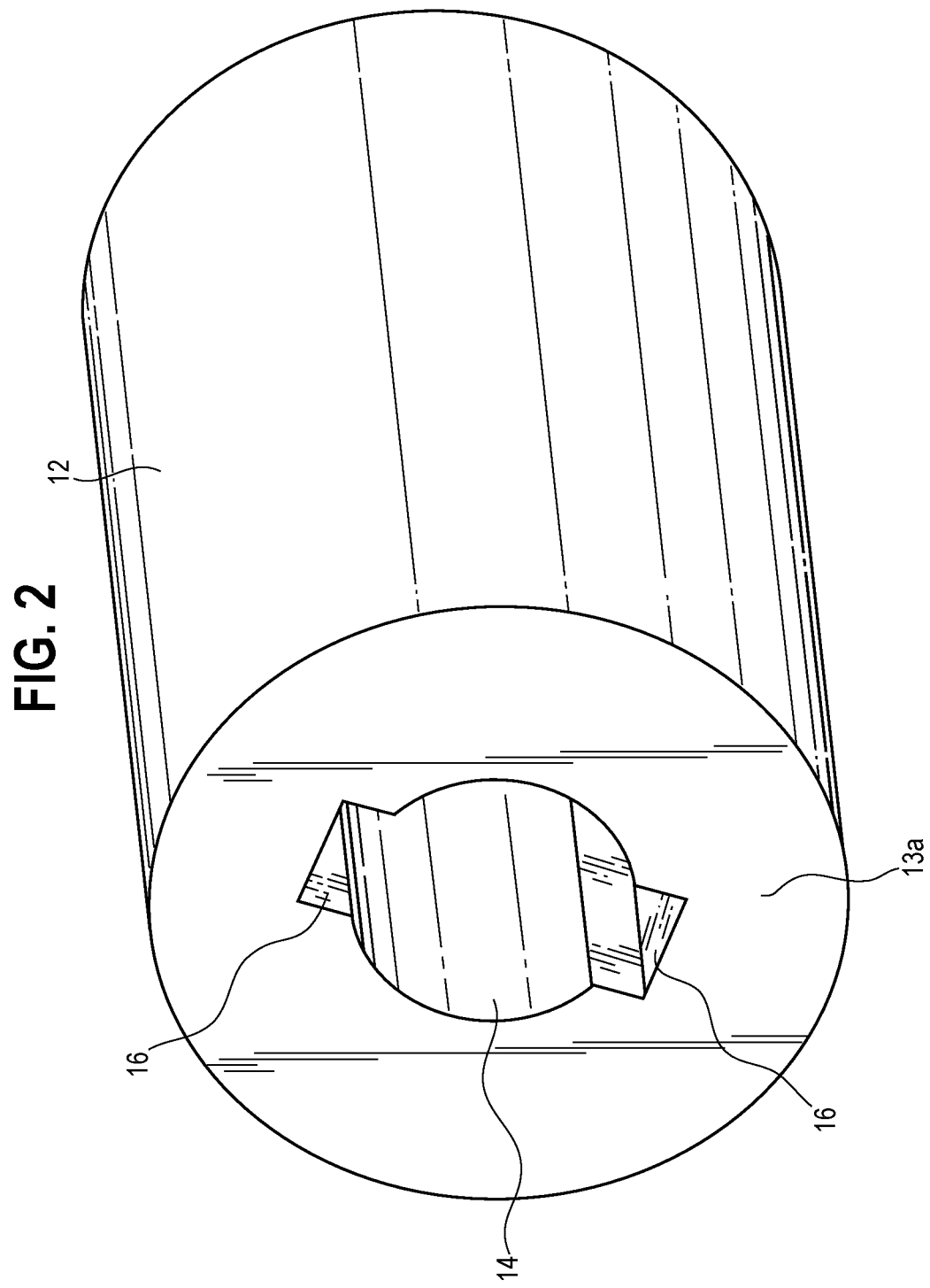
FIG. 2 depicts a simplified isometric view of the main body of the hand tool of FIG. 1.

Referring to FIGS. 1 and 2, a hand tool 10 in accordance with exemplary embodiments includes a main body 12 inside of which is a longitudinal void 14 extending from a proximal end 13a to a distal end 13b, thereby providing communication between proximal 14a and distal 14b apertures. This void includes one or more longitudinal slots 16 to enable insertion of an internal member 30 having one or more radially extending portions 32 (discussed in more detail below). The body 12 further includes bosses 20 at the distal end 13b that may serve as alignment devices when installing shims (discussed in more detail below). Also included within the body 12 is at least one radially disposed arcuate void 17 and at least one radially disposed shorter and parallel void 18, both of which are in communication with the longitudinal void 14, to enable rotational movement of the one or more radially extending portions 32 of the internal member 30 (discussed in more detail below).

The main body 12 with such internal voids 17, 18 may advantageously be produced using additive manufacturing ("AM", and also referred to as "3D printing") in accordance with well-known AM principles. As will be readily known by one of ordinary skill in the art, examples of AM processes include (without limitation) stereolithography (SLA), multi-jet modeling (MJM), fused deposition modeling (FDM), continuous liquid interface production (CLIP) and selective laser sintering (SLS). Any of these AM processes, or others, may be used for producing a container as discussed herein, depending upon the material desired for the body 12.

In accordance with exemplary embodiments, following initial production of the body 12, the longitudinal member 30 may be inserted via the proximal aperture 14a, with the one or more radially extending portions 32 passing through a respective one or more longitudinal slots (or "keyways") 16, until the radially extending portions 32 reach where the longitudinal void 14 intersects with the one or more radially disposed arcuate voids 17. A brace 36 may then be secured to the distal end of the longitudinal member 30 (e.g., using an adhesive between the inside of the brace 36 and the periphery of the distal end of the longitudinal member 30, or a set screw (not shown) tightened radially inward through the brace 36 against the periphery of the distal end of the longitudinal member 30). Later, the brace 36 may serve as an alignment and clamping device when installing shims (discussed in more detail below).

Next, a helical spring 38 may be inserted via the proximal aperture 14a about the longitudinal member 30 for compression within the proximal portion of the longitudinal void 14 when a handle 34 is placed onto the proximal end of the longitudinal member 30 and secured (e.g., using an adhesive between the inside of the handle 34 and the periphery of the proximal end of the longitudinal member 30, or a set screw (not shown) tightened radially inward through the handle 34 against the periphery of the proximal end of the longitudinal member 30). The compression of the spring 38 causes it to normally urge the handle 34 longitudinally away from the proximal end 13a of the body 12, which, in turn, urges the brace 36 toward the distal end 13b of the body 12 and the bosses 20. Conversely, urging of the handle 34 (e.g., by an operator of the tool 10) toward the proximal end 13a of the body 12 causes the spring 38 to re-compress and the brace 36 to advance longitudinally away from the distal body end 13b and bosses 20.

Alternatively, the main body 12 (with its internal voids 17, 18) and longitudinal member 30 may both be produced together, thereby predisposing the longitudinal member 30 within the body 12 at the end of the AM process. If so, then the one or more keyways 16 may be unnecessary since the longitudinal member 30 will already be positioned within the body with its one or more radially extending portions 32 disposed within the longitudinal void 14 or the one or more radially disposed arcuate voids 17.

Figure 3:
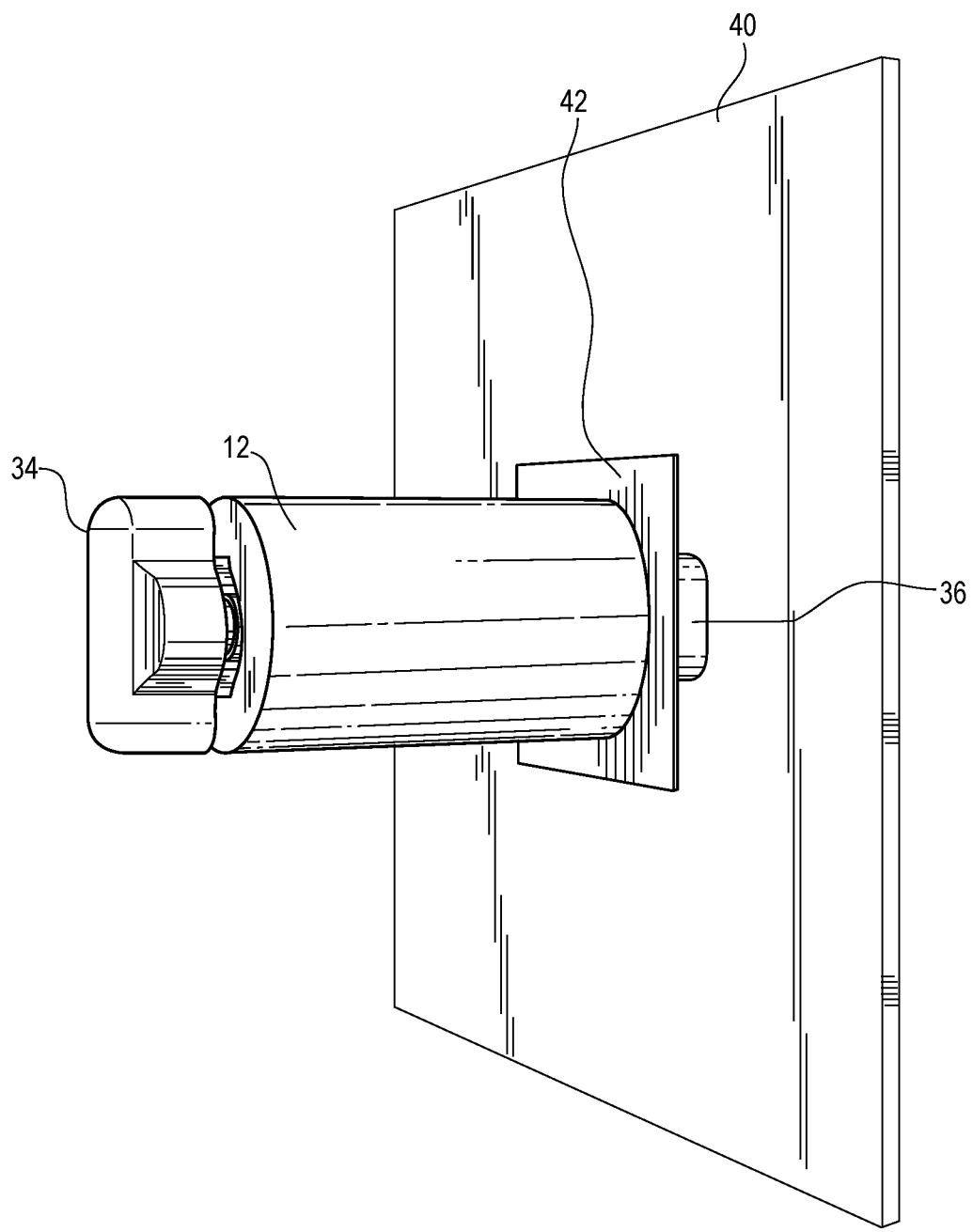
FIG. 3 depicts an isometric view of a use of the hand tool of FIG. 1 for alignment and placement of a shim in accordance with exemplary embodiments.
Figure 4:
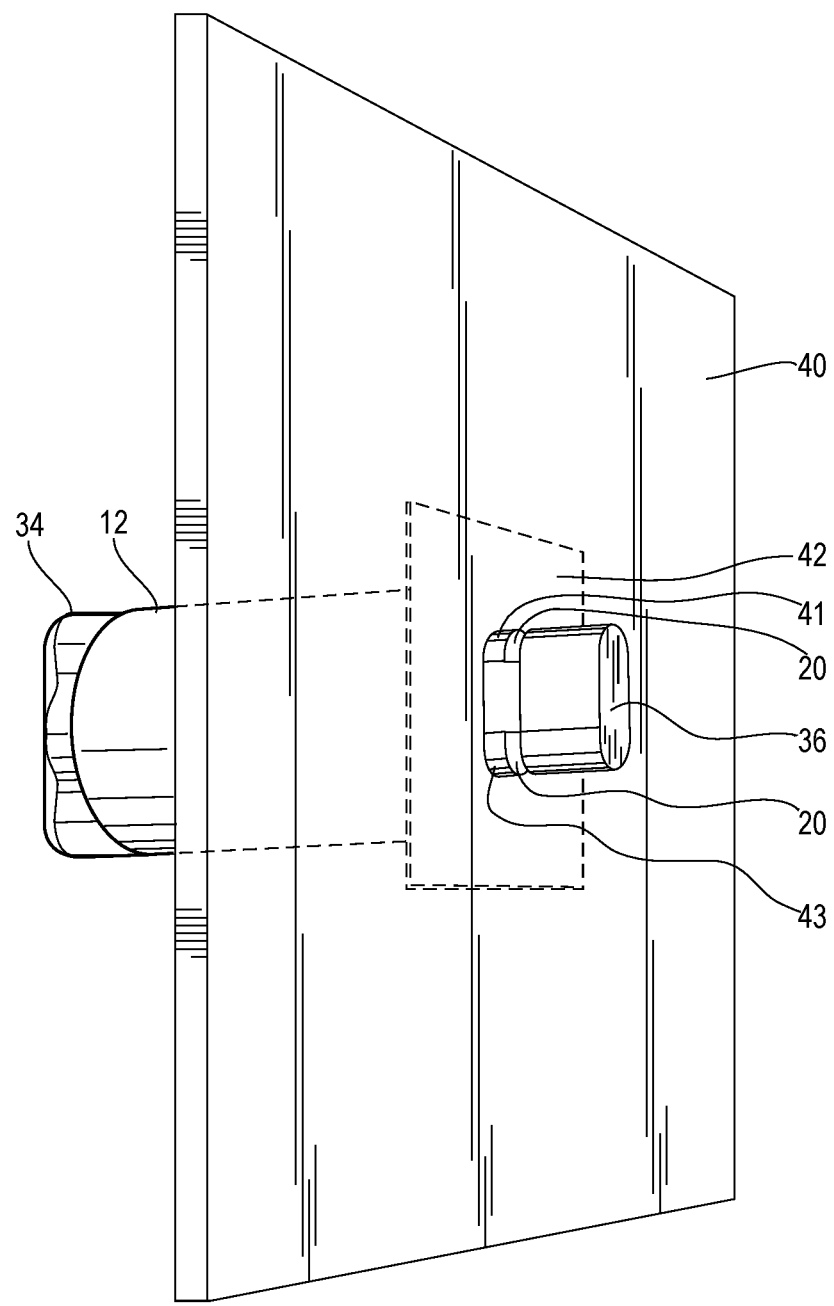
FIG. 4 depicts another isometric view of the use of the hand tool of FIG. 1 in accordance with exemplary embodiments.

Referring to FIGS. 3 and 4, as noted above, the tool 10 advantageously enables operation by a single operator to perform alignment, placement and clamping of a shim 42 to a panel 40. For example, alignment and placement can be performed by positioning the shim 42 on the distal end 13b of the body 12 by inserting the brace 36 and alignment bosses 20 through its aperture 43. This is facilitated by designing the shapes and peripheries of the bosses 20 and brace 36 to conform to the size and shape of the shim aperture 43. With the shim 42 in place on the distal end 13b of the tool body 12, the brace 36 and alignment bosses 20 may be inserted through an aperture 41 of the panel 40. With the sizes and shapes of the brace 36 and alignment bosses 20 matching the shim aperture 43 and panel aperture 41, as depicted here, self-alignment of the shim aperture 43 and panel aperture 41 is easily achieved.

Securing of the shim 32 to the panel 40 may then be performed by rotating the handle 34. This, in turn rotates the one or more radially extending portions 32 of the longitudinal member 30 through their respective arcuate voids 17 to their respective parallel voids 18 where they are free to be urged by the compressed spring 38 away from the distal end 13b of the tool body 12. This also causes the brace 36 to be rotated and pulled toward the distal end 13b of the tool body 12, which, in turn, causes the inner body portion of the rotated brace 36 to enter the gap between the alignment bosses 20 and outer body portions of the rotated brace 36 to come into contact with and be urged (with the tension applied by compressed spring 38) against the surface of the panel 40 surrounding its aperture 41. With application of a suitable adhesive (not shown) between the mating surfaces of the shim 42 and panel 40, the tool 10 may then be left in place with the compressed spring 38 maintaining necessary clamping pressure.

Following a sufficient time interval for curing of the adhesive, removal of the tool 10 may begin with the operator pushing the handle 34 toward the proximal body end 13a. This causes the brace 36 to move longitudinally away from the distal body end 13b and out from between the bosses 20. When the radially extending portions 32 of the longitudinal member 30 have moved to the distal ends of their respective parallel voids 18 toward the distal end 13b of the body, the operator may then rotate the handle 34 in an opposite direction, thereby causing the radially extending portions 32 to rotate back through their respective arcuate voids 17 to the longitudinal slots 16, and the brace 36 to become re-aligned with the bosses 20. At this point, the handle 34 may be released to allow the compressed spring 38 to urge the longitudinal member 30 toward the proximal body end 13b until the re-aligned brace 36 meets and contacts the bosses 20.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the disclosed embodiments (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. An apparatus including a hand tool, comprising:
    a housing with proximal and distal housing ends having respective end apertures in communication via a first internal void between the proximal and distal housing ends;
    a second internal void in the housing in communication with a portion of the first internal void and including
        a first void portion parallel with a longitudinal portion of the first internal void, and
        a second void portion adjacent a peripheral portion of the first internal void; and
    one or more internal members including
        a first member portion with proximal and distal member ends disposed at least in the first internal void between the proximal and distal housing ends, and
        a second member portion extending radially from the first member portion into one of the first or second void portion.

2. The apparatus of claim 1, further comprising a compression spring disposed coaxially about at least part of the first member portion.

3. The apparatus of claim 1, further comprising a brace coupled to the distal member end.

4. The apparatus of claim 1, wherein the distal housing end includes at least one boss adjacent the distal housing end aperture.

5. The apparatus of claim 1, further comprising a brace coupled to the distal member end, wherein a periphery of the brace is coextensive with a periphery of the at least one boss.

6. The apparatus of claim 1, further comprising a handle coupled to the proximal member end.

7. An apparatus including a hand tool, comprising:
    a housing with proximal and distal housing ends having respective end apertures in communication via a first internal void between the proximal and distal housing ends;
    a second internal void in the housing and including orthogonal first and second portions in communication with a portion of the first internal void; and
    one or more internal members including
        a first member portion with proximal and distal member ends disposed at least in the first internal void between the proximal and distal housing ends, and
        a second member portion extending radially from the first member portion into the second internal void.

8. The apparatus of claim 7, further comprising a compression spring disposed coaxially about at least part of the first member portion.

9. The apparatus of claim 7, further comprising a brace coupled to the distal member end.

10. The apparatus of claim 7, wherein the distal housing end includes at least one boss adjacent the distal housing end aperture.

11. The apparatus of claim 7, further comprising a brace coupled to the distal member end, wherein a periphery of the brace is coextensive with a periphery of the at least one boss.

12. The apparatus of claim 7, further comprising a handle coupled to the proximal member end.

13. A method for manufacturing a hand tool, comprising:
    forming, via an additive manufacturing process, a housing including
        proximal and distal housing ends having respective end apertures,
        a first internal void providing communication between the proximal and distal housing ends, and
        a second internal void including orthogonal first and second portions in communication with a portion of the first internal void; and
    inserting one or more internal members including
        a first member portion with proximal and distal member ends disposed at least in the first internal void between the proximal and distal housing ends, and
        a second member portion extending radially from the first member portion into the second internal void.

14. The method of claim 13, further comprising forming, via the additive manufacturing process, at least one boss adjacent the distal housing end aperture.

15. The method of claim 13, further comprising inserting a compression spring disposed coaxially about at least part of the first member portion.

16. The method of claim 13, further comprising coupling a brace to the distal member end.

17. The method of claim 13, further comprising coupling a brace to the distal member end, wherein a periphery of the brace is coextensive with a periphery of the at least one boss.

18. The apparatus of claim 13, further comprising coupling a handle to the proximal member end.

* * * * *